United States Patent
Bates et al.

(10) Patent No.: US 7,489,475 B1
(45) Date of Patent: Feb. 10, 2009

(54) INFORMATION OUTPUT FROM A SINGLE CHARACTER DISPLAY FOR LTO DRIVES

(75) Inventors: Allen K. Bates, Tucson, AZ (US); Daniel J. Winarski, Tucson, AZ (US); Nhan X. Bui, Tucson, AZ (US); Octaviano G. Gomez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/039,728

(22) Filed: Feb. 28, 2008

(51) Int. Cl.
*G11B 5/00* (2006.01)
(52) U.S. Cl. .................................................. 360/137
(58) Field of Classification Search ................ 360/137; 368/155
See application file for complete search history.

(56) References Cited

U.S. PATENT DOCUMENTS

| | | | |
|---|---|---|---|
| 3,925,777 A * | 12/1975 | Clark | 368/155 |
| 6,058,494 A | 5/2000 | Gold et al. | |
| 6,263,454 B1 | 7/2001 | Gold et al. | |
| 6,768,281 B2 | 7/2004 | Koski | |
| 7,116,506 B1 | 10/2006 | Mojica | |
| 7,206,156 B2 | 4/2007 | Ballard | |
| 7,277,246 B2 | 10/2007 | Barbian et al. | |
| 7,301,718 B2 | 11/2007 | Ballard | |
| 2004/0030961 A1 | 2/2004 | Ma et al. | |
| 2004/0143684 A1 | 7/2004 | Cheng | |
| 2004/0164990 A1 | 8/2004 | Chan et al. | |

OTHER PUBLICATIONS

Spectra Logic DAStape User Guide, 2003.
IBM TotalStorage Ultrium Tape Drive Models T800 and T800F, Setup, Operator, and Service Guide, Second Edition, Mar. 2005.

* cited by examiner

*Primary Examiner*—Tianjie Chen
(74) *Attorney, Agent, or Firm*—Carpenter & Assoc.; Robert K. Carpenter

(57) ABSTRACT

A tape drive, including: a housing including a single character display that displays a single character at a time; and an activator configured such that, when the single character display displays a single character representative of a status of the tape drive, activation of the activator causes the tape drive to further represent the status represented by the single character as information including a plurality of words detailing the status, the information provided by repeatedly spelling out a message, including the plurality of words describing the status of the tape drive, one letter at a time on the single character display, and an audible message provider that provides an audible message, including the plurality of words describing the status of the tape drive.

1 Claim, 2 Drawing Sheets

INFORMATION OUTPUT FROM A SINGLE CHARACTER DISPLAY FOR LTO DRIVES

CROSS-REFERENCE TO RELATED APPLICATIONS (Not Applicable)

Figure 1:
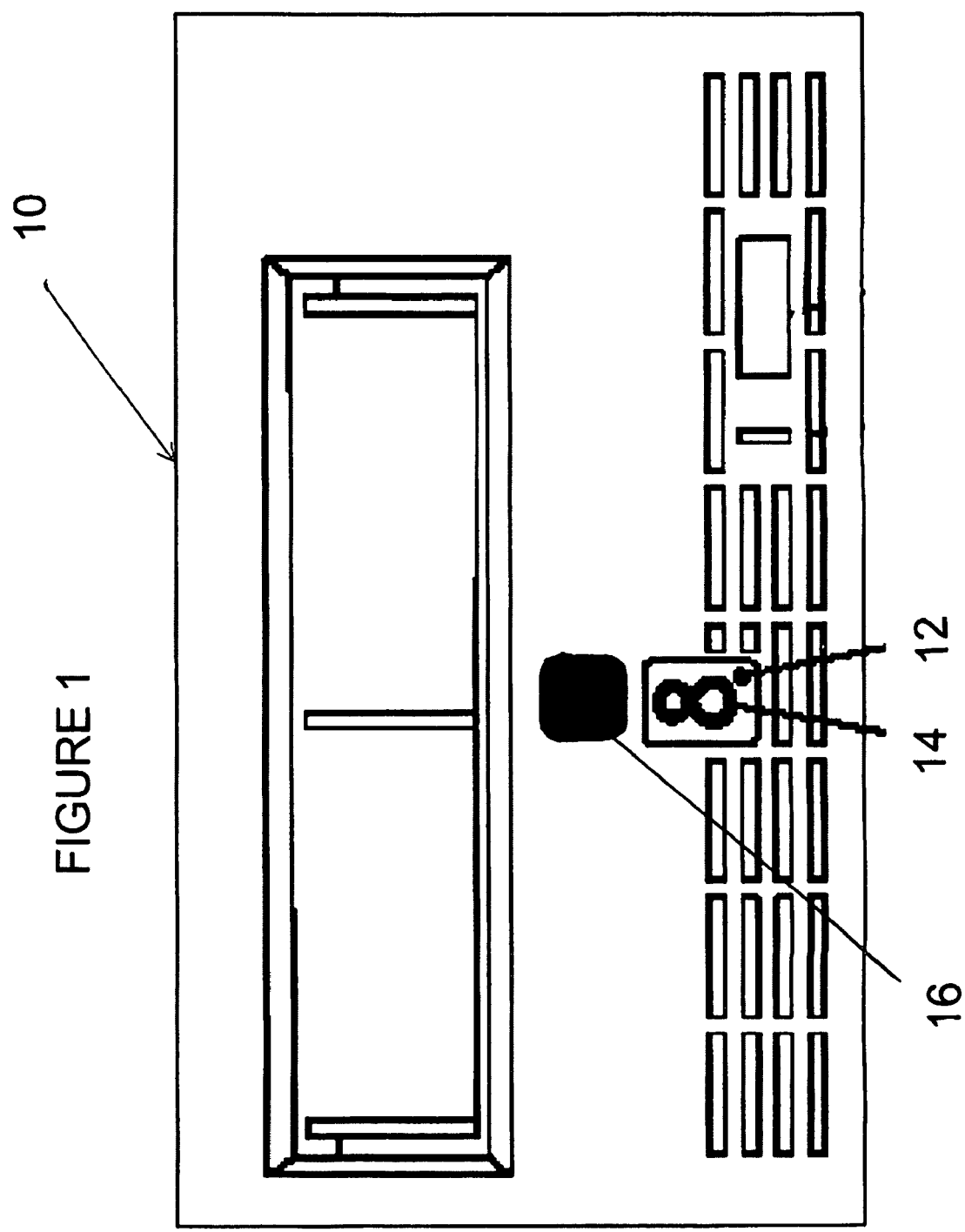

STATEMENT REGARDING FEDERALLY SPONSORED RESEARCH OR DEVELOPMENT (Not Applicable)

THE NAMES OF THE PARTY TO A JOINT RESEARCH AGREEMENT (Not Applicable)

INCORPORATION-BY-REFERENCE OF MATERIAL SUBMITTED ON A COMPACT DISC (Not Applicable)

BACKGROUND OF THE INVENTION (1) Field of the Invention

This disclosure is directed to an improved information output from a single character display for linear tape-open (LTO) tape drives.

(2) Description of Related Art Including Information Submitted Under 37 CFR 1.97 and 1.98

Conventional tape drives are known that include light emitting diodes (LEDs) on the front of the drive, including a single character display (SCD) that can present a single character code for error conditions and informational messages and for diagnostic or maintenance functions when in maintenance mode.

BRIEF SUMMARY OF THE INVENTION

At least some aspects of this disclosure are directed to a tape drive having a single character display (SCD) that provides detailed information regarding the status of the tape drive.

Other aspects of this disclosure are directed to a tape drive that provides detailed information regarding the status of the tape drive apparatus that can be produced utilizing methodologies disclosed herein.

Other aspects of this disclosure are directed to methods for providing status information from a tape drive utilizing methodologies and/or tape drive structures disclosed herein.

In particular, at least some aspects of this disclosure are directed to a tape drive, including: a housing including a single character display that displays a single character at a time; and an activator configured such that, when the single character display displays a single character representative of a status of the tape drive, activation of the activator causes the tape drive to further represent the status represented by the single character as information including a plurality of words detailing the status, the information provided by repeatedly spelling out a message, including the plurality of words describing the status of the tape drive, one letter at a time on the single character display, and an audible message provider that provides an audible message, including the plurality of words describing the status of the tape drive.

In at least some embodiments, various aspects and embodiments of this disclosure can enable a user (for example, a user of an automation library, server or bridge box) to decide to receive additional information from a tape drive for diagnostics and status.

In at least some embodiments, additional information can be provided, for example, audibly, spelled on a single character display or through a wireless device in conjunction with a tape drive.

Other exemplary embodiments and advantages of this disclosure can be ascertained by reviewing the present disclosure and the accompanying drawings.

BRIEF DESCRIPTION OF THE SEVERAL VIEWS OF THE DRAWING(S)

Figure 2:
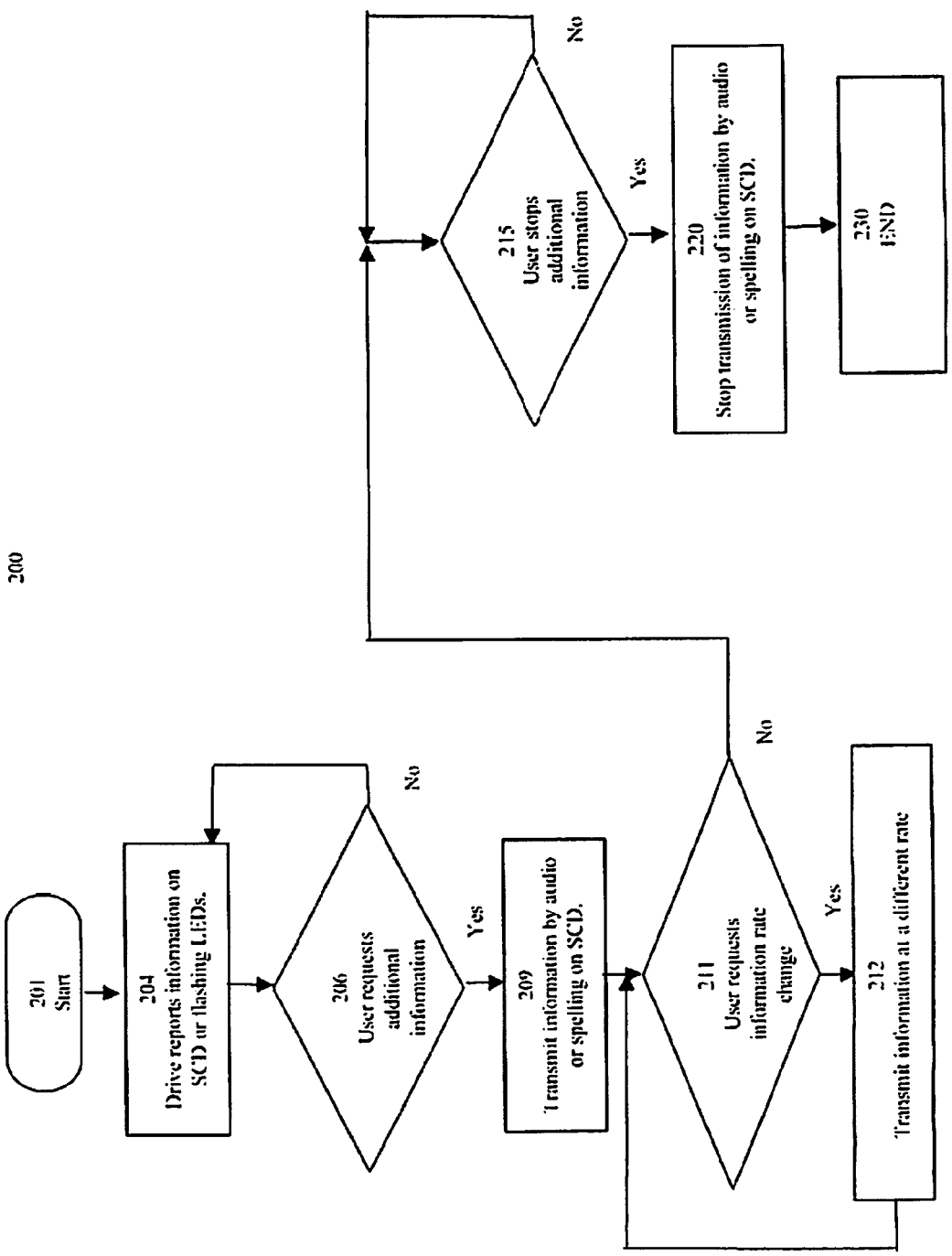

This disclosure is further described in the detailed description that follows, with reference to the drawings, in which:

FIG. 1 illustrates a front panel of an LTO drive showing a single character display in accordance with at least some aspects of this disclosure; and FIG. 2 is a flowchart illustrating an embodiment of a process and system in accordance with at least some aspects of this disclosure.

DETAILED DESCRIPTION OF THE INVENTION

Exemplary embodiments of this disclosure are described herein by way of example.

At least some aspects of this disclosure are directed to tape drives. In particular, at least some aspects are directed to improvements in methods and systems for the information produced by LTO tape drives for diagnostics and operation status. Conventional tape drives can utilize a single character display (SCD) or multi-colored flashing LEDs.

When utilizing conventional tape drives having an SCD or LEDs, a tape drive user who does not know what each of the single character codes represents may have to read a manual to determine the information communicated by the SCD or LEDs.

A cross reference table with the SCD output and/or flashing frequency can be utilized to determine the status of the drive. However, the user can have many different drives from different suppliers, each having a different cross reference table to explain the SCD or flashing LEDs, which can inconvenience the user.

A system and method to improve the information transmitted from the drive to the customer would be beneficial.

Illustrative exemplary embodiments of this disclosure are discussed below.

An example of the front face of a tape drive 10 in accordance with at least some aspects and embodiments of this disclosure is shown in FIG. 1. In at least some embodiments of this disclosure, the tape drive 10 has a single character display (SCD) 12 that displays a character 14 (the numeral eight is shown in FIG. 1 as an example of character 14).

SCD 12 first conventionally displays a number or letter that corresponds to the information that needs to be transmitted. This display of only the number or letter is a method now in use, and for experienced users, quickly transmits the desired information to the user.

However, with at least some of the embodiments of this disclosure, to obtain additional information, the user indicates to the drive by activating an activator (by touching the screen, drive, pushing a button, etc.), for example activator button 16 in FIG. 1 to provide additional information.

The drive 10 then, in an exemplary embodiment, has the SCD 12 spell out the information on the SCD 12 one letter at a time. For example, SCD "3" can define that "Drive determined that a microcode error has occurred. Drive dump is required prior to drive being powered off."

To obtain more information, by activating the activator button 16 or the like (by touching the screen, drive, pushing a button, etc.), the user can indicate to the drive 10 to provide more information. The drive 10 then spells out, for example, "DRIVE DETERMINED THAT A MICROCODE ERROR HAS OCCURRED. DRIVE DUMP IS REQUIRED PRIOR TO DRIVE BEING POWERED OFF" or alternatively a shorter message conveying the same information is spelled out for the user.

In at least some embodiments, the drive 10 can continue to spell out the message until, by activating the activator button 16 or the like (or by touching the screen, drive, etc.), the user can indicate to the drive to stop providing the information.

In certain embodiments, for example, by activating the activator 16 twice or holding the activator for an extended period of time (or by touching the screen, drive, etc.), the user can indicate to the drive 10 to spell the message slower or faster. In certain embodiments the SCD 12 is a dot matrix or other display to enable spelling in foreign languages (for example Katakana or Hiragana for Japanese) thus enabling the user to quickly receive and understand the information provided by the drive.

In certain embodiments the SCD 12 is a dot matrix or other display to enable displaying a graphic or picture that indicates the problem or action required by the user (for example, a cartridge graphic with a line through it indicating a bad cartridge).

In at least a second aspect of this disclosure, the SCD 12 first conventionally displays a number or letter that corresponds to the information that needs to be transmitted. This display of only the number or letter is a method now in use, and for experienced users, quickly transmits the desired information to the user.

To obtain additional information, by activating an activator, for example the activator button 16 (or by touching the screen, drive, speaking to the drive, etc.), the user can indicate to the drive 10 to provide additional information.

The drive then can utilize verbal output through, for example, a small speaker located on the drive 10, to verbally transmit the information to the user. For example, SCD "2" can define that "Drive detected that the externally supplied power is outside of specified voltage limits. Error condition clears when drive is powered off."

To obtain more information, by activating the activator button 16, or the like (for example by touching the screen, drive, speaking to the drive, etc.), the user can indicate to the drive to provide more information.

The drive then verbally says, "DRIVE DETECTED THAT THE EXTERNALLY SUPPLIED POWER IS OUTSIDE OF SPECIFIED VOLTAGE LIMITS. ERROR CONDITION CLEARS WHEN DRIVE IS POWERED OFF" for the user.

In certain embodiments more or less information can be provided. In at least some embodiments, the drive 10 can continue to verbally transmit the message until, for example, by activating the activator button 16 or the like (for example by touching the screen, drive, speaking to the drive, etc.), the user can indicate to the drive 10 to stop providing the information.

In certain embodiments, for example, by activating the activator button 16 or the like (for example by touching the screen, drive, speaking to the drive, etc.), the user can indicate to the drive 10 to say the message slower or faster. In certain embodiments the user verbal message can be transmitted in foreign languages (for example German, Japanese, etc.).

In both of the above embodiments, the drive 10 default method can be retained (i.e. SCD or flashing LEDs). The additional information transmitted is optional by choice of the user.

In certain embodiments, the drive 10 can transmit the information (i.e. by Bluetooth, etc.) to an external device with a display or speaker (i.e. cell phone, computer, PDA, etc.) for the user.

Although FIG. 1 shows a front panel of an LTO drive showing a single character display, other drives can be utilized such as drives utilizing flashing LEDs or combinations thereof.

FIG. 2 shows a flowchart for improved information from a single character display for LTO tape drives. In the flowchart, flow 200 begins at step 201, and then step 204 is executed where the drive can report information on the SCD or flashing LEDs. Control flows to step 206.

If the user requests additional information at step 206 then step 209 is executed, otherwise the loop of steps 204-206 is continually executed. At step 209 the drive transmits information by audio or spelling on the SCD or other means. Control flows to step 211.

At step 211 the user can request an information rate change to speed up or slow down the audio or spelling rate. If at step 211, the user requests an information rate change, step 212 is executed to transmit information at a different rate, and control flows back to step 211. If at step 211, the user does not request an information rate change, step 215 is executed.

At step 215, the user can stop the transmission of the additional information. If at step 215, the user stops the transmission of the additional information, step 220 is executed to stop the transmission of information by audio or spelling on SCD and control flows to step 230 to end. If at step 215, the user does not stop the transmission of the additional information, step control flows back to step 215.

Thus, the various aspects and embodiments of this disclosure can enable a user (for example, a user of an automation library, server or bridge box) to decide to receive additional information from a tape drive for diagnostics and status. Additional information can be provided, for example, audibly, spelled on SCD or through a wireless device in conjunction with a tape drive.

The foregoing exemplary embodiments have been provided for the purpose of explanation and are in no way to be construed as limiting this disclosure. This disclosure is not limited to the particulars disclosed herein, but extends to all embodiments within the scope of the appended claims, and any equivalents thereof.

The invention claimed is:

1. A tape drive, comprising:
    a housing comprising a single character display that displays a single character at a time; and
    an activator configured such that, when the single character display displays a single character representative of a status of the tape drive, activation of the activator causes the tape drive to further represent the status represented by the single character as information comprising a plurality of words detailing the status, the information provided by repeatedly spelling out a message, comprising the plurality of words describing the status of the tape drive, one letter at a time on the single character display; and
    an audible message provider that provides an audible message, comprising the plurality of words describing the status of the tape drive.

* * * * *